FIG. 1

T. D. MOWLDS.
PROCESS AND MACHINE FOR CHANNELING STONE.
APPLICATION FILED OCT. 24, 1911.

1,012,569.

Patented Dec. 19, 1911.

T. D. MOWLDS.
PROCESS AND MACHINE FOR CHANNELING STONE.
APPLICATION FILED OCT. 24, 1911.

1,012,569.

Patented Dec. 19, 1911.
5 SHEETS—SHEET 5.

UNITED STATES PATENT OFFICE.

THOMAS D. MOWLDS, OF BALA, PENNSYLVANIA.

PROCESS AND MACHINE FOR CHANNELING STONE.

1,012,569.     Specification of Letters Patent.     Patented Dec. 19, 1911.

Continuation of application Serial No. 499,841, filed June 3, 1909. This application filed October 24, 1911.
Serial No. 656,378.

*To all whom it may concern:*

Be it known that I, THOMAS D. MOWLDS, a citizen of the United States, and a resident of Bala, Pennsylvania, have invented a certain new and useful Process and Machine for Channeling Stone, of which the following is a specification.

This invention relates to improvements in rock channeling machines and processes for channeling, and has particular reference to that class of machines and processes used for the purpose of cutting channels in rock as it lies in its natural bed in a quarry; and it aims to provide a comparatively light and inexpensive machine that may be easily moved from place to place about the quarry and along over the channel being cut, and be so adjustable as to place the cutting devices in the most advantageous positions for cutting the rock.

The object of my invention is to cut the stone free from the side wall of the channel, as against breaking or prying it loose there, and to turn from this side wall cut, parallel to the channel, to a transverse cut, across the channel, by a connecting curve, so that there shall be no exposed tool corner.

A further object of my invention is to successively cleave along the forward edge and wedge rearwardly in curved cuts extending from side to side of the channel.

A further object of my invention is to cut the rock by cleaving impact blows upon successive curved preferably crescent-shaped portions.

A further object of my invention is to deliver a cleaving impact blow upon the extreme forward edge of a curved area and, coincidently, to wedge toward the interior of the tool.

A further object of my invention is to use an impact tool cutting along curved lines of contact upon the extreme outer face of the tool, and preferably presenting the same character of cutting face in either direction of cut.

A further object of my invention is to permit impact cutting of a channel having vertical closed ends, without previously drilling end holes.

A further object of my invention is to support impact drills and immediate operating parts within a frame capable of entering the channel in order that the tools may be supported and stiffened against deflection close to their work, while supplying the power from outside the channel, whereby I am able to use a light spindle and narrow tool, greatly reducing the motive power required and the waste resulting.

The invention further consists in the novel construction, combination and arrangement of the several parts of the device as hereinafter described, illustrated in the drawings, and more particularly pointed out in the claims hereunto appended.

I have preferred to illustrate my invention by one form thereof which, in operation, has proved inexpensive, practical and relatively simple, using this form as an example only and recognizing that part or all of the advantages of my invention might be obtained by various other embodiments thereof.

In the preferred form of my invention.

This application is a continuation as to certain features of my prior application for "rock channeling machines," Serial Number 499,841, filed June 3rd, 1909. The claims herein are intended to include the claims now held to be allowable in the earlier application.

Referring to the drawings, 1 is a table or platform upon which the operating parts of my rock channeling machine are carried. This table or platform may be supported in any suitable manner, but is shown as mounted upon a track and provided with wheels whereby it may be moved from point to point along the line of the channel being cut.

Figure 1:
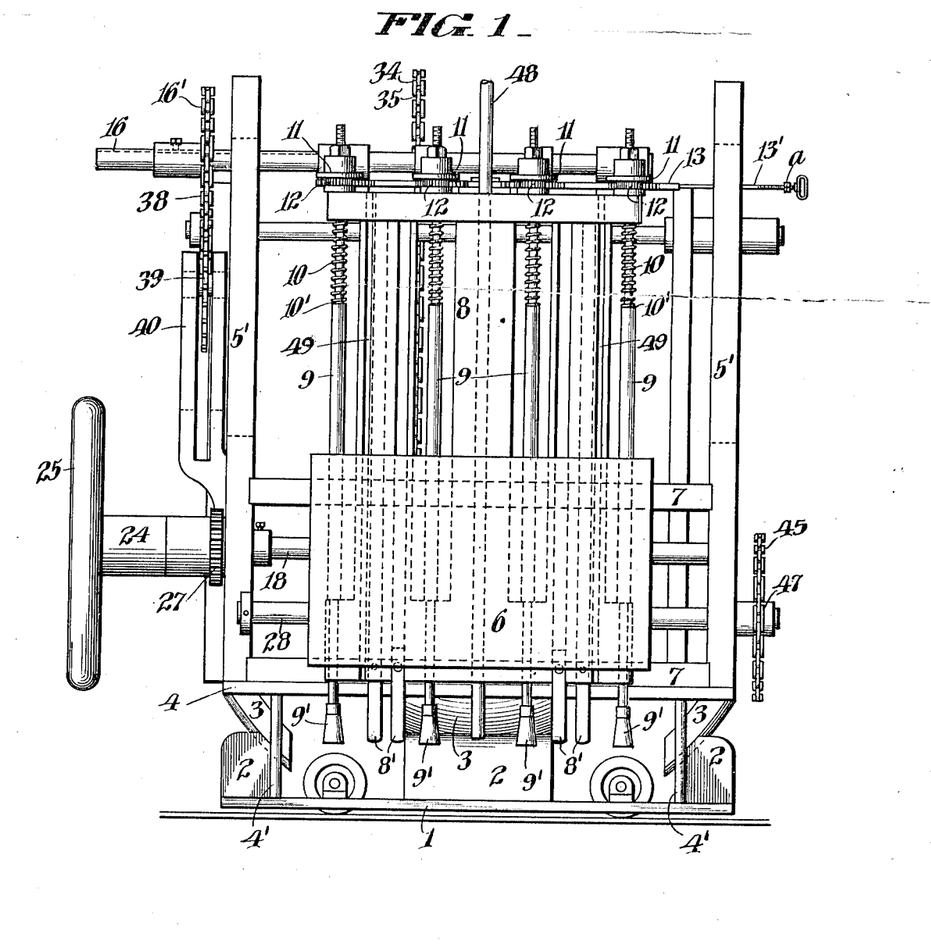
Figure 1 is a front elevation of the machine.
Figure 2:
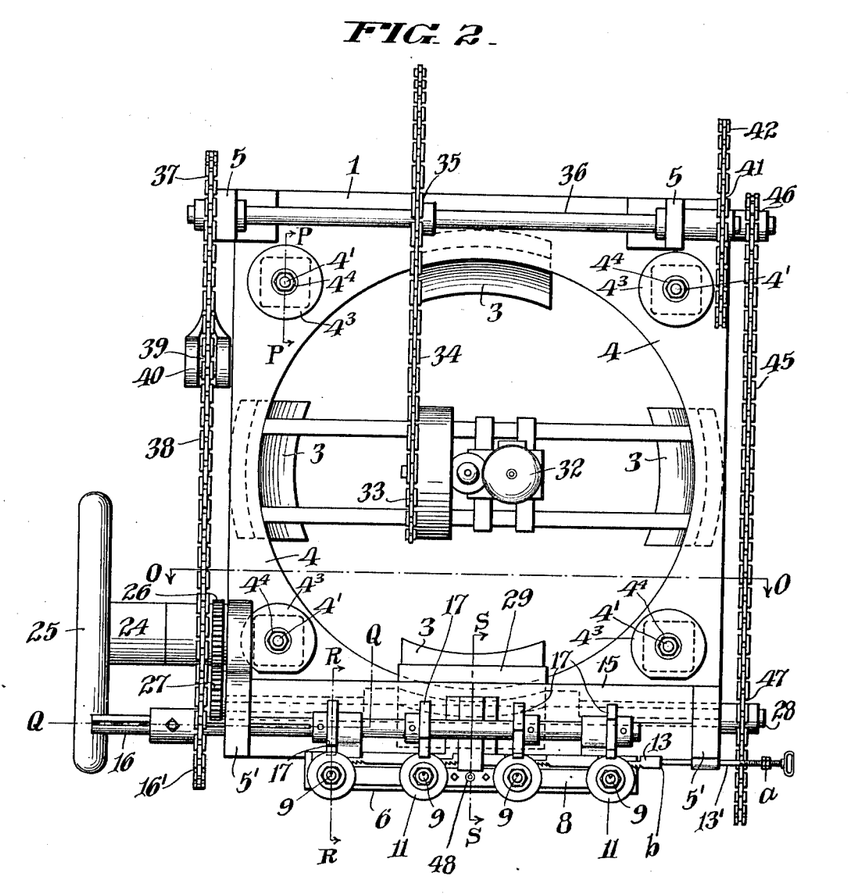
Fig. 2 is a plan view of the structure of Fig. 1.
Figure 3:
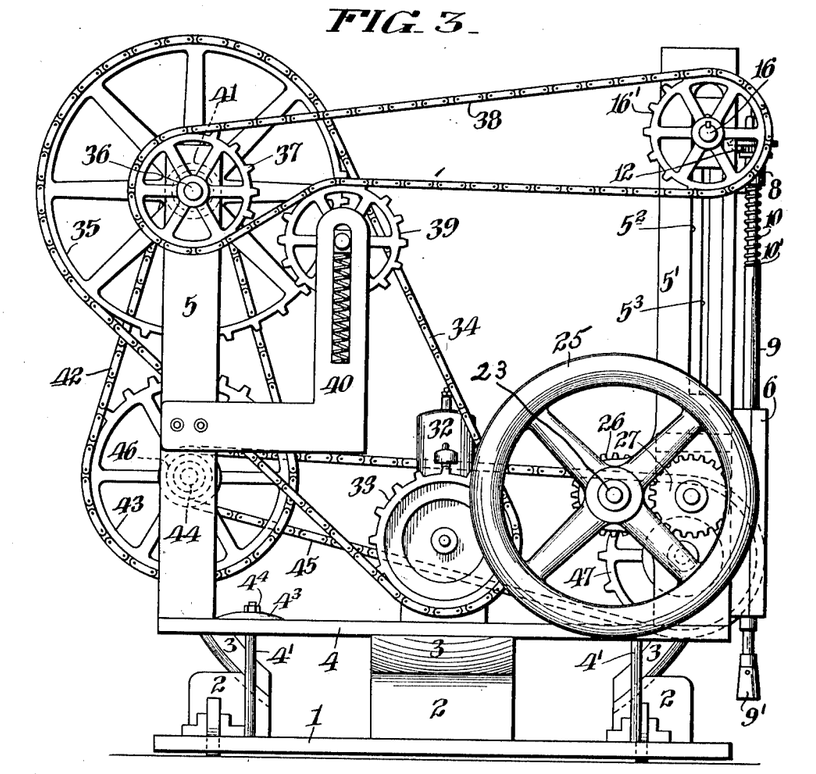
Fig. 3 is a side elevation of the device shown in Figs. 1 and 2.

The numerals 2, 2, 2, 2 represent four spherically concaved supports or brackets rigidly secured on the upper side of the platform 1, and 3, 3, 3, 3 are four coöperating spherical convex supports or brackets rigidly secured on the under side of the base 4 of the machine. The two sets of brackets coöperate as shown in Figs. 1 and 3 of the drawings, to form a ball and socket union between the table or platform 1 and the frame 4. This construction is equivalent to a universal joint and could be substituted by other forms of such a joint. It permits angular adjustment freely in all directions within the range of the coöperating concave and convex parts indicated. After the machine has been set in the position desired, the parts are rigidly secured, as set, by the four rods or bolts 4', 4', 4', 4'. For convenience of description, etc., the machine and process will be regarded throughout as carried out by vertical cutting and horizontal feed of the cutting tools during the cutting operation, but it will be evident that the same relations of the parts to each other would be maintained though the base be so set as to cause the tools to cut at any desired angle, the direction of tool feed being parallel to that of the length of the tool-carrying rods and the feed of the frame being in a plane perpendicular to these rods in any case. Each bolt 4' passes through a large opening 4² in the base 4 and is surmounted by a washer 4³, preferably spheroidal in cross-section, and suitably held in place by a nut 4⁴.

5, 5 and 5', 5' are suitable standards or supports located at or near the four corners of the base 4 and rigidly secured thereto. The standards 5', 5' are located, preferably, at the front corner, while the standards 5, 5 are located at or near the rear corners of the base 4. Each of the standards 5', 5' is provided with a vertically extending opening or slot 5², 5³ (Fig. 3) for a purpose hereinafter stated.

7, 7 are horizontal supports set between the standards 5', 5' and rigidly secured thereto. They are provided with ways or channels 7', 7' for a purpose hereinafter stated.

The frame 6 is slidable laterally with respect to its length, being adapted to move back and forth in this direction, herein considered for convenience, as stated, horizontal, along the support 7 in the channels 7'. It is held in operative relation with these guides and channels by the guides 6', 6' secured thereto and fitting within the channels 7', 7'. The frame 8 is movable perpendicularly to the frame 6, which means that it is here considered as having a vertical movement. It passes through the rectangular vertical opening 6² in the frame 6 and carries the drill rods 9, 9, 9, 9, preferably four in number.

In order to permit the frame 8 to follow automatically as the depth of the channel increases, so as to provide for downward tool feed, I support this frame upon rods or extensions 8', 8', 8', 8', here shown as four in number, rigidly secured to the lower end of the frame 8, rounded at their ends and beveled on their inner sides. These extensions of the frame rest upon the bottom of the channel while the cutters are chopping and consequently allow the frame 8 to move by gravity down into the channel as the rock is cut away.

The drill rods 9, 9, 9, 9, here shown as four in number, are mounted in the vertically movable frame in such a manner that they have a reciprocating movement perpendicular to the bottom of the channel being cut, independent of the vertical movement of which the frame 8 is capable. Around the upper portions of the drill rods 9 are positioned spiral springs 10, held thereon and adapted to be compressed between the shoulders 10' on the drill rods and the upper part of the frame 8, as shown, so that they will constantly tend to press the drill rods down to their lowermost possible position, limited as hereinafter shown.

Upon the lower ends of the drill rods 9, I place the drill points or cutters 9', which are preferably secured upon the rods by threaded connection therewith. The cutting faces of the drill points are concaved and the cutters, preferably, have a circular cutting face. It is important that they cut along curved lines of contact in order that they may be able to turn from their cut parallel to and at the side of the channel to their cut across the middle of the channel without presenting an exposed tool corner. I thus secure efficient side clearance of the channel by the side cutting and effective transverse channel cutting with the same tool. I avoid the destruction of the corner which takes place when an exposed corner is made to take not only the duty, equal to that at the tool center, of cutting a strip whose width, along the length of the channel is equal to the normal forward feed, but also the added, greater and heavier duty of breaking the stone away from the solid side channel wall where the stone is most firmly supported. I prefer to round not only the transition portion, from the side to the front of the cut, which takes the place of the corners, but to extend the rounded portion about the entire cutting edge, making the cutting edge of the tool a true circle both for this reason and because of the greater simplicity in its manufacture. This has an additional advantage in that the semi-circular active cutting edge presents substantially an arch formation against the lateral strain which it receives in its successive cuts. This advantage is present, though not to the same extent, with a flatter curve. The arch is of greatest advantage at the extremities of the cut where the tool is cutting against the vertical end channel wall. The inactive half, in the cylindrical tool form, gives an additional stability by reinforcing the active part of the tool against lateral pressure, and makes it possible to obtain all the advantages due to rotatability. The advantages in rotation lie in the ability to vary the section of the tool which is active, turning the tool to any desired extent. This permits a previously idle portion of the tool to be brought into cutting position and also permits a part which has been worn or injured, through engagement with a hard spot or vein of rock, to be moved to a position of lighter duty at the same time that a relatively fresh portion of the tool can be brought to bear upon the spot or vein. This rotation can be effected with a circular tool to any extent without varying the width of the channel cut and without removal from the channel. A further advantage of continuity of cutting edge arises from the fact that the normally inactive (rear) half of the tool completes the cutting of any rib left through injury or defect in the front of the tool.

While preferring a completely and uniformly curved line of cut, I have illustrated herein and desire to cover as part of my process, the cutting of a channel by successive cuts in which the transition from the side positions, parallel with the channel, to a flattened, here straight (Fig. 12), transverse cutting line are curved, avoiding exposed corners. The transition curves may be of any desired degree of curvature, regular or irregular. Whether the middle portion of the cut taken be curved or flattened, the effect is much the same since this portion is relatively unsupported by the side walls and can be separated from the remainder by my process at a rate of cut equaling the longitudinal cutting feed along the length of the channel, since it is easier to separate the part cut from the laterally little-supported middle portion than from the more firmly supported sides. Theoretically, the semi-circle represents the best cutting line because it graduates the width of material cut, from that corresponding to the feed along the length of the channel, at the middle, to approximately nothing at the sides. There are also practical advantages in using the circular cutting edge. These are ease of tool construction, simplicity of sharpening and the advantages possible from rotation; but a part of the benefit of my invention would be secured with a flattened or straight front cut in the middle, provided the corners be taken care of by curves of sufficient degree of curvature.

I give my tool its clearance toward the part already cut in order that there may be cleavage upon the extreme forward edge of each new area affected with wedging away from the cleavage point. The wedging action of curved cutting parts is radial. The impact blows thus cleave at the extreme forward edge of the new area acted upon and wedge the separated part inwardly from the cleavage edge.

The cutting faces of the tools or points 9' are of a diameter slightly in excess of the thickness of the vertically movable frame 8, so that the channel cut by said drill points will be wider than the thickness of said frame 8, thus permitting this frame to follow its cutters down into the channel being cut.

11, 11 indicate suitable heads securely fastened to the upper ends of the drill rods 9, above the top of the frame 8, by suitable means, preferably nuts. Beneath each of the heads 11 is a toothed wheel 12 splined on the drill rods 9, so as to allow said drill rods to move up and down therein.

15 is a bracket secured to the top of the slidable frame 8, and extends horizontally to the rear thereof. It is adapted to carry a slidable rack 13, extending across the top of the vertically movable frame 8, which rack engages with each of the toothed wheels 12. The rack is held in contact with each of said toothed wheels 12 by a spring-pressed slide 14, carried in the bracket 15. The end of the rack 13 is provided with an extension 13', which projects outwardly through a slot $5^2$ in one of the standards or supports 5', as shown. This extension 13' is provided with two stops, $a$, $b$, that limit the lateral movement thereof, as is evident.

The numeral 16 indicates a shaft attached to and extending horizontally across the top of the vertically movable frame 8, and having one end thereof projecting through the slot $5^2$ in one of the standards 5', and having splined on its end, outside of the standard 5', a sprocket wheel 16'. This spline permits movement of said shaft 16 through the hub of the sprocket wheel 16', as is apparent.

Figure 4:
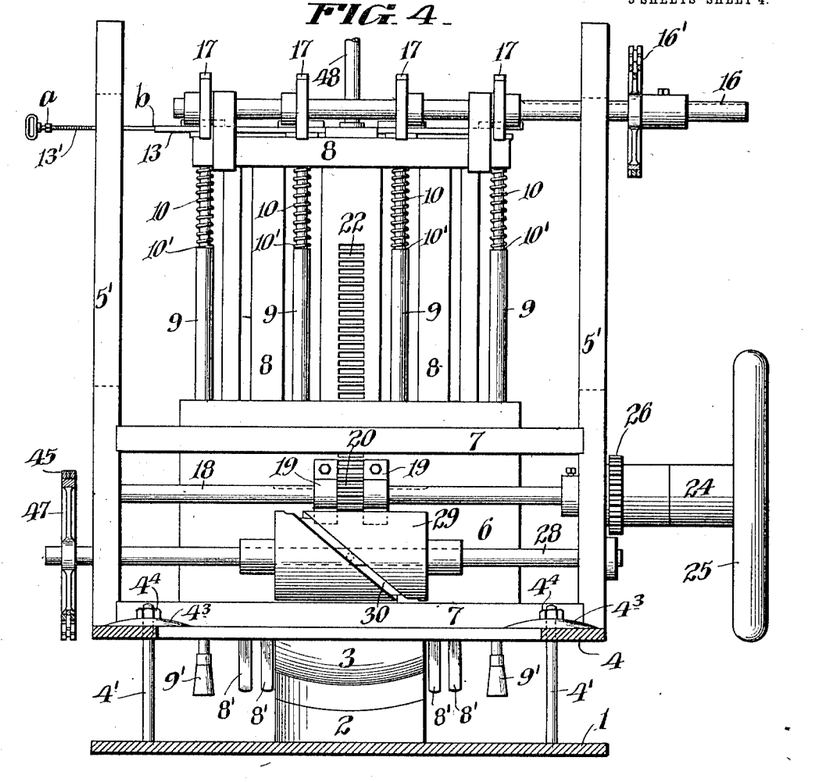
Fig. 4 is a vertical section taken upon the line O—O of Fig. 2, omitting certain parts for clearness.
Figure 5:
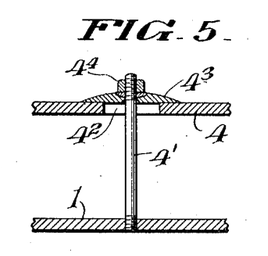
Figs. 5 and 6 are detail broken sections taken upon the lines P—P and Q—Q of Fig. 2.
Figure 6:
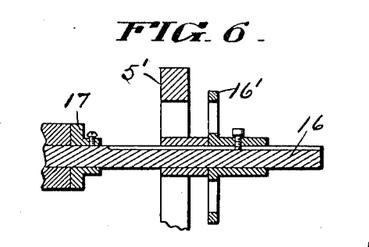
Figure 7:
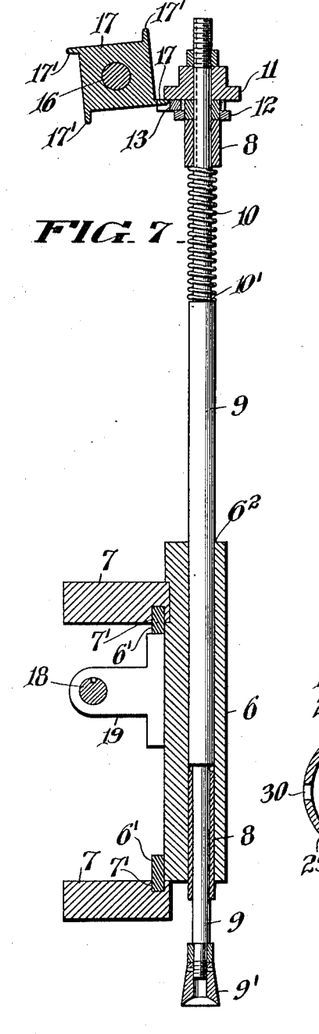
Figs. 7 and 8 are vertical sections taken upon the lines R—R and S—S of Fig. 2.
Figures 8, 9:
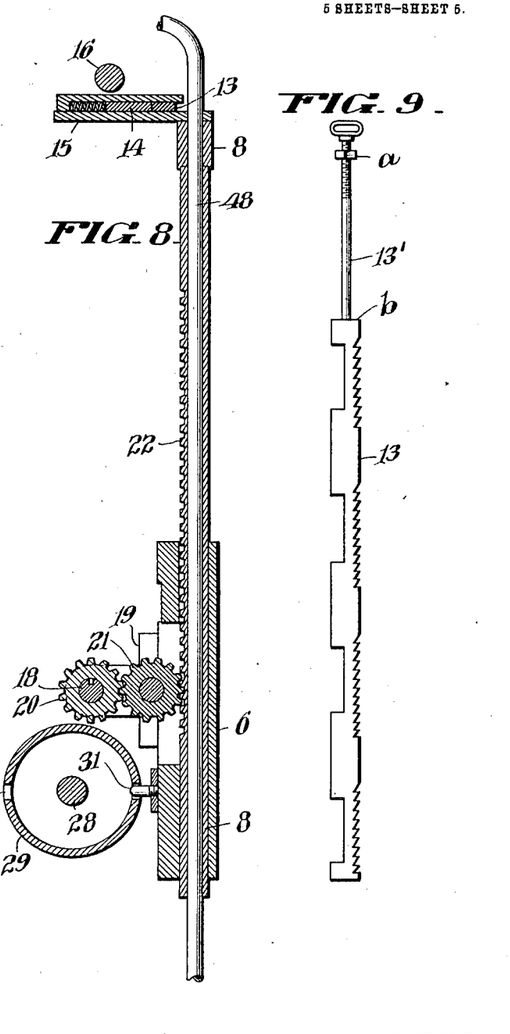
Fig. 9 is an elevation of a drill-turning device.

Rigidly secured on the shaft 16, adjacent to the heads 11, and adapted to engage therewith, are four wheels 17. Each of these wheels has lugs or projections 17', here shown as four in number, on its periphery, which are for the purpose of intermittingly engaging said heads 11, and raising the drill rods 9 so as to give a downward chopping movement to the drill points. The wheels 17 are so set angularly about the shaft 16 as to lift the rods 9 successively. 18 is a shaft journaled in the standards or supports 5', 5' and extending across the machine to the rear of the horizontal slidable frame 6. It passes through ears 19, 19, secured to the rear of slidable frame 6, as shown. Mounted on said shaft 18, between the ears 19, 19, is a pinion 20, which is splined on said shaft 18, and is adapted to mesh with a suitably supported idler 21. The idler is adapted to engage a rack 22 in the rear side of the vertically movable frame 8, as shown in Fig. 4.

The numeral 23 indicates a sleeve or barrel journaled on a stud 24, having at its outer end a hand wheel 25, and on its inner end, adjacent to the standard 5′, a pinion 26 meshing with a similar pinion 27, carried by the end of shaft 18. It is for the purpose of raising the vertically movable frame 8, and the cutters carried thereby, out of the channel when desired.

The numeral 28 indicates a shaft located below and parallel with the shaft 18, and extending across the machine to the rear of said frame 6, and having bearing in the supports 5′, 5′. Rigidly secured to said shaft 28 is a cylinder 29 having an inclined or spiral groove 30 therein, as shown in Fig. 4. This groove 30 extends one-half way around from one end of the cylinder to the other in one direction and back again on the other side in the opposite direction, being continuous and extending around said cylinder in an inclined or spiral direction. At the reversing points the groove extends circumferentially for some distance without axial extension, permitting the frame 6 to dwell at the limits of its forward and backward movements a sufficient length of time to allow the cutters to make several chopping movements, so as to make a complete cut on the reverse movement.

31 is a stud securely fastened on the back of the horizontally slidable frame 6, and extending into the spiral groove 30 in the cylinder 29.

A suitable source of power 32, preferably an electric motor or gasolene engine, is mounted on suitable supports extending across the frame or base 4. 33 is a sprocket wheel on the driving shaft of this engine.

34 is a chain belt extending from the sprocket wheel 33 on the driving shaft of the engine to a sprocket wheel 35, rigidly secured on a counter shaft 36, journaled in the brackets or standards 5, near the top thereof, at the back of the machine. A sprocket wheel 37 is mounted on one end of the counter shaft 36 to the outer-side of one of the standards 5, and a chain belt extends from it to the sprocket wheel 16′ on the end of the shaft 16, carried on top of the vertically movable frame 8. A spring-pressed idler sprocket wheel 39 is mounted in a bracket 40 secured to one of the supports 5, and engages and serves to take up the slack in the chain belt 38, caused by the vertical movement of the sprocket wheel 16′. A small sprocket wheel 41 is mounted on the opposite end of the counter shaft 36. From this a chain belt 42 extends to a larger sprocket wheel 43, mounted at one end of a shaft 44, below and parallel with said shaft 36. A chain belt 45 extends from the small sprocket wheel 46 also mounted on said shaft 44, outside of the sprocket wheel 43, to a larger sprocket wheel 47 on the end of the shaft 28, on which is mounted said inclined or spiral groove cylinder 29.

A pipe or tube 48 extends vertically through the frame 8, down nearly to the bottom of the cutters 9′. Two small grooves 49, 49 extend vertically from the top to the bottom of the slidable frame 8, and are provided for the purpose of carrying small tubes or pipes so that water may be introduced into the channel. This water, when mixed with the cuttings may be pumped out through the pipe 48, although this will not be necessary if the channel be open at one end so that the cuttings may be washed out by gravity.

Figure 10:
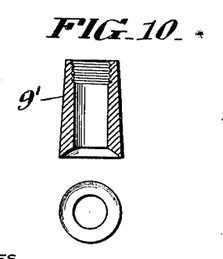
Figs. 10, 11 and 12 are longitudinal sections grouped with corresponding bottom plan views of tools used in carrying out my process and in operating my machine.
Figure 11:
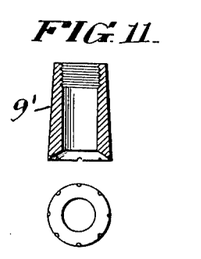

While I prefer the unbroken cutting edge shown in Fig. 10, some characters of laminated stone are broken up better when the cutting edge is slightly serrated at intervals, as shown in Fig. 11. This still secures such substantial continuity of curve as to gain nearly, if not quite, all of the advantages of my curved cut. In this figure I would call attention to the fact that the intermediate parts are curved sections in or approximately in the same plane.

Figure 12:
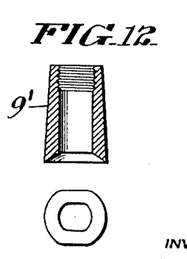

In Fig. 12 the flattened middle portion is intended to form the advanced cutting edge though the tool could be used with the flattened portions at the sides. In the former case the tool could be turned by half rotations without removal from the channel, while this is not true of the latter.

The operation of the device is as follows:—The machine being placed over the rock to be channeled, and the operative parts thereof being adjusted to the desired position or angle, the engine is started and the various shafts and belts are put in motion. The drill rods 9, carried by the vertically movable frame 8, are raised from their lowermost position by wheels 17, mounted on the shaft 16, carried by said frame 8, when said shaft 16 is revolved. Motion is communicated to this shaft 16 from the engine through the sprocket wheel 16′, sprocket wheel 37, and sprocket chain 38, shaft 36, sprocket wheel 35, sprocket wheel 33, and the sprocket chain 34. The horizontally slidable frame 6 is caused to move backward and forward through the engagement of the lug 31 on the rear side thereof, with an inclined or spiral groove 30 in the cylinder 29, mounted on a shaft 28, located to the rear side of frame 6. Movement of this shaft 28 is transmitted from the engine through the sprocket wheel 47, sprocket chain 45, sprocket wheel 46, sprocket wheel 43, shaft 44, chain 42, sprocket wheel 41, shaft 36, sprocket wheel 35, sprocket wheel 33, and sprocket chain 34.

From the construction and operation of this machine, it will be evident that the drill rods will have a vertical chopping movement and that between each chop the slidable frame 6 will be shifted a very short distance, preferably not more than about one-eighth of an inch, whereby the cutting tools will make a crescent-shaped cut at each downward movement of said cutters. The total lateral distance traveled by the slidable frame 6 is equal to the distance between the cutter rods 9, and therefore, each cutter will cut a portion of the channel, longitudinally, equal to the distance between said cutter rods, whereby a complete, clear and even-sided channel, having a width equal to or slightly in excess of the diameter of the cutting tool, is made.

It will be obvious from the construction and operation of the machine that it is not necessary to withdraw the cutting tools from the channel when it is desirous to shift such tools longitudinally of said channel.

The vertically movable frame 8, which carries the cutter rods, is supported upon the legs or supports 8'. These supports hold the frame in proper position above the rock, while the cutter bars are being reciprocated. It will be observed, however, that as the rock is cut away from beneath the ends of these supports, they, together with the frame 8, will pass into the channel and carry the cutter bars with them, thus permitting an increasingly deeper channel to be made.

The rack 13, which serves to rotate the drill rods 9, 9, always lies in contact with the toothed wheels 12. When held against forward movement by engagement of the stop $a$ with supports 5', which occurs when the frame has reached the limit of its forward movement, the wheels 12 are given a slight rotation and the cutters 9' are turned so that a different part of their outside surface will rub against the sides of the channel as the cutters move up and down. When the rack 13 is held against movement in the opposite direction by engagement of the stop $b$ with the support 5', the toothed wheels 12 slide along over the ratchet rack without being rotated. It is apparent that if it should be desired to rotate the rods 9, when the frame 6 shall have reached the limit of its backward movement, this may be accomplished by reversing the positions of the rack 13 and the toothed wheels 12. It is also evident that the rods may be rotated before the frame 6 has reached the limit of either its forward or backward movement, by adjusting the stop $a$ toward the stop $b$. The extent of movement can also evidently be thus controlled. If desired, the rack 13 may be operated by hand to turn the cutters at any time.

Having thus described my invention, what I claim as new and desire to secure by Letters Patent is:—

1. In a rock channeling machine, a plurality of relatively movable frames, a plurality of cutter-carrying rods reciprocable in one of said frames, means for normally pressing each rod in the direction of its cutter, means for successively moving the rods in a different direction, shifting mechanism for the frame carrying the rods, a ratchet gear upon each rod, a ratchet rack and a stop connected with the ratchet rack to cause movement of each ratchet gear at the extremity of the shifting movement.

2. In a rock channeling machine, a plurality of reciprocable cutter-carrying rods, means for moving them back and forward along the path of a channel, means for reciprocating the rods, a ratchet gear secured to each rod, a ratchet rack engaging each of said ratchet gears, spring means for normally holding the rack in contact with the gears and stops operatively connected to the ratchet rack to cause movement of it at the end of the movement in the path of the channel.

3. A rock channeling machine having in combination therewith, a cutter-carrying frame, cutters carried by said frame and movable therein, means for forcing said cutters into chopping engagement with the rock and extensions on the end of the cutter-carrying frame, said extensions resting against the rock and maintaining the proper relative positions of the cutters and the rock to be cut.

4. In a rock channeling machine, laterally and vertically movable cutter-carrying frames, cutter-carrying rods mounted in the vertically movable frame, a head secured to each cutter rod above the vertically movable frame, a toothed wheel splined on each rod beneath said head, a rack bar adapted to engage said toothed wheels on the cutter rods and partially rotate the same, and a stop engageable with the frame of the machine to move the rack bar when the frame is moved laterally.

5. In a rock channeling machine, a supporting frame, a plurality of means for supporting the same from the track or ground, a spherically concaved support in proximity to each supporting means, a spherically convexed coöperating supporting means for each spherically concaved means and a rock channeling mechanism supported upon the convexed supporting means.

6. In a rock channeling machine, a frame, wheels carrying the frame, a plurality of ball and socket coöperating pairs of supports having a common center, the pairs being arranged about a circle having a diameter approximately equal to the distance between the drills at opposite ends of the frame and rock channeling mechanism supported by said coöperating pairs.

7. In a rock channeling machine, a vertically movable supporting frame, means for moving the frame laterally along the path of a channel, a vertically reciprocable cutter-bar movable in said frame, a cutter on said cutter-bar and a support for said frame resting in the path of the cutter to permit the frame to lower as the channel is deepened by the cutter.

8. In a rock channeling machine, laterally and vertically movable frames, a plurality of cutters reciprocable in said vertically movable frame, means for moving said cutters to form a channel and a support for said vertically movable frame resting in the channel and determining the height of the frame by the depth of the channel.

9. In a rock channeling machine, a laterally movable frame, a plurality of reciprocable cutter-carrying rods therein, circular cutters upon said rods, means for reciprocating said cutter-carrying rods, means for partially rotating said cutters and means for laterally moving the frame.

10. In a stone channeling machine, a frame adapted to enter the channel and having a guiding passage perpendicular to the line of the bottom of the channel and located near one end of the frame, a cutter-carrying rod reciprocable in and guided by said passage, a cutter upon the rod having a cutting edge extending, horizontally, beyond the leading edge of the frame, with bottom clearance rearwardly to pull the rod against the forward wall of the guiding passage when the cutter is in operation, and presenting the same character and angle of cutting edge to the cut with feed in either direction along the channel.

11. In a stone channeling machine, a frame adapted to enter the channel and having a guiding passage near each end, cutter-carrying rods, one reciprocable in each passage, and horizontally alined cutters upon the two rods, the cutting edge of each cutter being located below the frame, with an edge extending, horizontally, beyond the line of its end of the frame and having bottom clearance toward the other cutter to cause each, when leading, to pull its rod against the forward side of its own guiding passage.

12. The method of channeling stone, which consists in making an initial circular cut and in successively enlarging the cut in one direction by a series of impact blows directed against crescent-shaped adjoining portions of the stone producing a wedging pressure toward the last previous cut taken.

13. The method of channeling stone, which consists in making an initial cut, and in elongating the cut by a succession of crescent-shaped impact wedging cuts to form a channel and at the same time to wedge the crescent-shaped portions of material toward the cuts previously made.

14. The method of channeling stone, which consists in progressively delivering wedging blows to crescent-shaped sections of the material along the path of the channel.

15. The method of channeling stone, which consists in intermittently striking blows having cleavage action upon the forward edge and wedging action toward the rear along curved lines of contact and advancing the lines of contact along the path of a channel.

16. The method of channeling stone, which consists in intermittently striking blows having cleavage action upon the front edge and wedging action toward the rear along lines of contact which are transverse to the channel length at the middle thereof, substantially parallel to the channel sides at the sides, and pass from the transverse to the parallel direction by a curve, and advancing the lines of contact along the path of the channel.

17. The method of channeling stone, which consists in progressively delivering impact blows to the stone mainly upon the extreme forward edge of the cut, forming a curved cut at each blow, which cut is substantially continuous across the channel.

THOMAS D. MOWLDS.

Witnesses:
 HELEN I. KAUFFMAN,
 A. HELEN ABPLANALP.

---

Copies of this patent may be obtained for five cents each, by addressing the "Commissioner of Patents, Washington, D. C."